3,847,903
METHOD FOR EXTRACTING AND ISOLATING RIFAMYCIN O FROM FERMENTATION BROTHS OF RIFAMYCINS
Carlo Turolla, Milan, Giovanni Bonfanti, Sesto San Giovanni, and Carmine Pasqualucci, Milan, Italy, assignors to Archifar Industrie Chimiche del Trentino S.p.A., Trento, Italy
No Drawing. Filed Mar. 1, 1973, Ser. No. 337,119
Int. Cl. C07d 41/00
U.S. Cl. 260—239.3 P                   4 Claims

ABSTRACT OF THE DISCLOSURE

Method by which Rifamycin O is extracted and isolated from Rifamycin B fermentation broths with yields up to about 90% and dry titre of at least 70%. The fermentation broth is brought to about 15°–25° C. at pH ranging between 4.0–7.5 and is treated with an oxidizing agent causing a quantitative precipitation for a raw product of Rifamycin O.

---

This invention relates to a method for extracting and isolating rifamycins from fermentation broths.

The methods heretofore used for extracting and isolating rifamycins from fermentation broths provide, following broth filtering, a somewhat complicated, time consuming and expensive extracting process in order to obtain a product having a sufficient degree of purity.

Thus, according to the prior art and after filtering, the broth was acidified and extracted with chloroform to remove diethyl barbituric acid along with other impurities; the organic phase was re-extracted with a buffered solution at about 7.5 pH and, following acidification, the latter was again re-extracted with ethyl acetate.

Such a process is disclosed in U.S. Patent Specification No. 2,988,490, according to which Rifamycin B is obtained by concentrating ethyl acetate.

In an industrial process, described instead in "Progress in Industrial Microbiology," Vol. VI (1967), pages 23–60, the above described process is again followed, then extracting again with a buffer, and the buffered aqueous phase is treated with an oxidizer by which Rifamycin B is converted to Rifamycin O, the latter slowly precipitating.

It is the primary object of the present invention to provide a method according to which Rifamycin O can be extracted and isolated from fermentation broths in a single pass, readily and extremely economically, with very high yields ranging up to about 90%.

It is another object of the invention to provide a method by which Rifamycin O can be isolated from Rifamycin B fermentation broth without any use of solvents.

These and still other objects of the invention are achieved by a method according to which a fermentation broth of rifamycins containing Rifamycin B is filtered, the clear liquid is brought to a temperature of about 15° C.–25° C. and pH ranging between about 4.0–7.5, and is treated with an oxidizing agent selected among sodium nitrite, sodium persulphate and hydrogen peroxide, to convert Rifamycin B to Rifamycin O insoluble in the filtered broth and precipitating therefrom.

By such a method a crude product of Rifamycin O is quantitatively precipitated, having a dry titre not less than 70% and wherein neither diethyl barbituric acid, nor Rifamycin Y would be found.

It is suitable to note that by the method according to the present invention, by keeping the temperature and pH at the above shown ranges, upon oxidation and only due to this oxidation, those products will precipitate that can be oxidized and the oxidized products of which are insoluble; this in practice allows to the isolation of Rifamycin O from the fermentation broths in which it is highly diluted, and this in an almost complete manner. Thus, while the solutions being at a highly diluted state, only about 2% Rifamycin O is lost in the precipitation mother liquors.

For a better understanding of the features and practice of the inventive method, some practical embodiments or examples thereof will now be described, as given only for explanation purposes and not in a limiting sense.

EXAMPLE 1

10 liters of fermentation broth having a Rifamycin B titre of 2,800 $\gamma$/ml. were brought to 7.0 pH with 10% sodium hydroxide, 400 gr. diatomite were added and after 30 min. stirring, the broth was filtered. The mixture was washed with 2 liters aqueous solution at 7.0 pH 26.5 g. water-solved sodium nitrite were added to the collected clear filtrate having a volume of 10.80 liters and 2,450 $\gamma$/ml. titre.

Then, a 10% sulphuric acid solution was very slowly added up to 4.6 pH.

The broth was slowly stirred for 4 hours at 25° C., maintaining 4.6 pH by continuously adding diluted sulphuric acid, the precipitated solid was filtered, finally washing with deionized water.

The titre of the mother liquors was 19 $\gamma$/ml.

After drying, 30.5 g. product were obtained having 2.8% humidity and a titre of 84% Rifamycin O.

By crystallization and quantitative yields, a product can be obtained having a titre higher than 95%.

EXAMPLE 2

10 liters of filtered clear broth, obtained as in Example 1 and having 2,450 $\gamma$/ml. Rifamycin B titre, were added under slow stirring for 3 hours with a sodium persulphate solution dissolved in 50 ml. water, adjusting pH to 5.6.

Upon completion of said solution addition, stirring was continued for other 2 hours at 15° C., the filtering the precipitated product and washing with water.

The titre of the mother liquors was 54 $\gamma$/ml.

After drying, 31.4 g. product were obtained, having 3.8% humidity and 75% Rifamycin O titre.

Substantially the same results were obtained where pH ranged between about 4.0 and 7.5.

EXAMPLE 3

By slowly stirring, 10 liters of filtered clear broth, as obtained in Example 1 and having a titre of 2,450 $\gamma$/ml., were added with 60 ml. of 130 volume hydrogen peroxide in 3 hour time, pH being maintained at about 7.0.

At the end, stirring was continued for other 2 hours, then filtering and washing with water.

The titre of the mother liquors was 37 $\gamma$/ml.

After drying, 21.2 g. product were obtained, having 2.4% humidity and 76.1% Rifamycin O titre.

Substantially the same results were obtained when keeping the reaction pH at 40–7.5.

What we claim is:

1. A method for extracting and isolating Rifamycin O from a fermentation broth of rifamycin containing Rifamycin B comprising:
   filtering said broth to obtain a clear liquid;
   bringing said clear liquid to a temperature within 15–25° C., and to a pH within 4.0–7.5;
   treating said clear liquid with an oxidizing agent selected from the group consisting of sodium nitrite, sodium persulphate, and hydrogen peroxide to convert said Rifamycin B to Rifamycin O, a precipitate insoluble in the treated clear liquid; and
   separating said precipitated Rifamycin O from the treated clear liquid.

2. A method as claimed in Claim 1, wherein said pH is about 4.6 and said oxidizing agent is sodium nitrite.

3. A method as claimed in Claim 1, wherein said pH is between about 4.0 and about 7.5 and said oxidizing agent is sodium persulphate.

4. A method as claimed in Claim 1, wherein pH for the filtered broth ranges between about 4.0–7.5 and said oxidizing agent is hydrogen peroxide.

References Cited
UNITED STATES PATENTS
3,150,046   9/1964   Sensi et al. _____ 260—239.3 P FOREIGN PATENTS
924,472   4/1963   Great Britain ____ 260—239.3 P HENRY R. JILES, Primary Examiner R. T. BOND, Assistant Examiner U.S. Cl. X.R.

260—999